(No Model.)
H. A. MOYER.
SPRING VEHICLE.
No. 292,036. Patented Jan. 15, 1884.
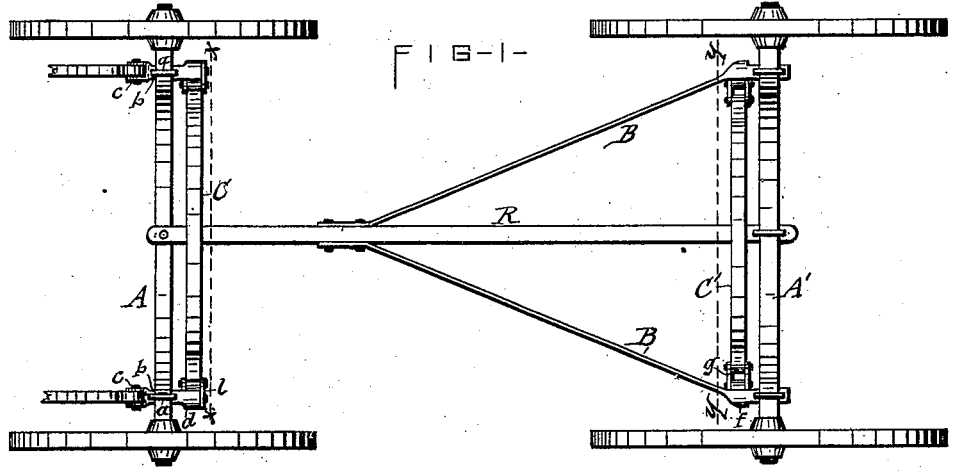
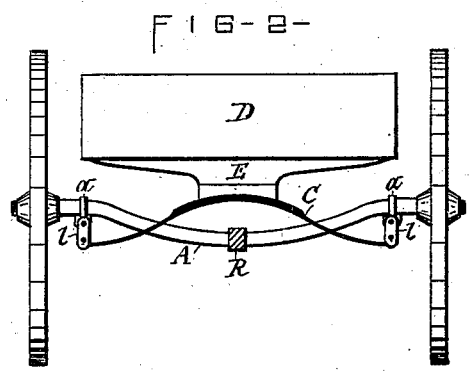
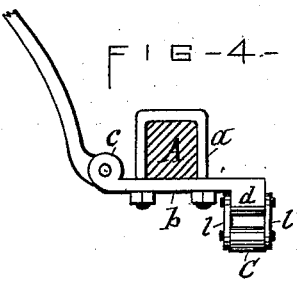
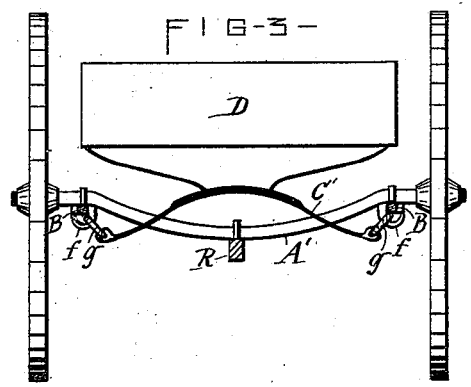
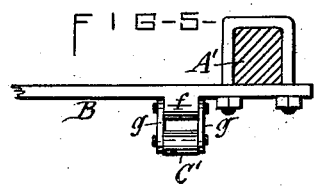
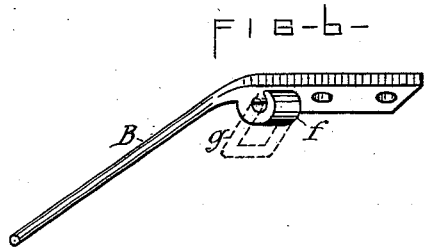
ATTEST—
Wm. C. Raymond.
J. H. Gibbs.
INVENTOR—
Harvey A. Moyer
per Duell, Laass & Hy
Attys

UNITED STATES PATENT OFFICE.

HARVEY A. MOYER, OF SYRACUSE, NEW YORK.

SPRING-VEHICLE.

SPECIFICATION forming part of Letters Patent No. 292,036, dated January 15, 1884.

Application filed October 3, 1883. (No model.)

*To all whom it may concern:*

Be it known that I, HARVEY A. MOYER, of Syracuse, in the county of Onondaga, in the State of New York, have invented new and useful Improvements in Spring-Vehicles, of which the following, taken in connection with the accompanying drawings, is a full, clear, and exact description.

This invention consists in improved means for coupling cross-springs to the side of the axle, as hereinafter more fully described, and specifically set forth in the claims.

The invention is fully illustrated in the annexed drawings, wherein Figure 1 is a plan view of a vehicle with the body and bolsters removed, to expose the combination and arrangement of the constituent parts of my improvement. Fig. 2 is a vertical transverse section on line $x\ x$. Fig. 3 is a vertical transverse section on line $y\ y$. Figs. 4 and 5 are enlarged longitudinal sections taken at the side of the spring-supports, and Fig. 6 is an enlarged detached perspective view of the rear end of the reach-brace.

Similar letters of reference indicate corresponding parts.

A and A' represent, respectively, the front and rear axles of the vehicle, said axles being of the so-called "coach-bed" form, or depressed between its two ends, as shown in Figs. 2 and 3 of the drawings, for the purpose hereinafter explained.

R denotes the reach, connected at opposite ends to the center of the respective axles, and B B are two reach-braces attached to the hind axle, near the wheels thereof, and extending diagonally to and connected with the reach.

D denotes the body of the vehicle, supported by two cross-springs, C C', which are coupled to the side of the two axles by the following instrumentalities: To the forward axle, near the wheels thereof, are secured two clips, $a\ a$, the clip-bar $b$ of which is formed, at its forward end, with ears or suitable couplings, $c$, for the attachment of the thills. The rear end of said clip-bar is formed with a sleeve, $d$, which stands with its axes horizontally at a right angle to the axle, and is in proximity to the same. In the sleeve $d$ hangs a link, $l$, and with said link is connected the end of the cross-spring C, which is of the form of either a semi-elliptic or half-platform spring, the central portion thereof rising a proper height to afford the spring the requisite play and to support the bolster E, which is connected therewith by a king-bolt, and carries the forward end of the body. The rear cross-spring, C', I hang on the reach-braces B B, which I provide near the hind axle with a sleeve, $f$, swaged, or otherwise formed integral with said brace, said sleeve standing horizontally at a right angle to the axle, and having hung on it a link, $g$, to which is attached one end of the rear cross-spring, C'. The central depression of the coach-bed axles, in conjunction with the reach connected to the center of said axles, serves to brace the latter, so as to enable it to resist the twisting strain exerted by the weight carried by the spring-coupling on the side of the axle.

Having described my invention, what I claim as new, and desire to secure by Letters Patent, is—

1. The combination, with the axle, of a clip-bar attached thereto and formed at one end with a thill-coupling and at the opposite end with a spring-coupling, and a cross-spring hung on the latter.

2. The combination, with the axle, of a clip-bar attached thereto and formed at one end with a thill-coupling and at the opposite end with a sleeve standing with its axes horizontally at right angles to the axle, a link hung in said sleeve, and a cross-spring connected with the link, substantially as described and shown.

3. In combination with the front and rear running-gears, two reach-braces connected to the hind axle and formed at the side of said axle with a sleeve standing with its axes at a right angle to the axle, a link hung in said sleeve, and a cross-spring connected to the link, substantially as described and shown.

4. The combination of two axles formed with a depressed central portion, a reach connected to the center of said axles, reach-braces attached to the hind axle near the wheels thereof, and cross-springs coupled to the side of the axles, substantially as specified and shown.

In testimony whereof I have hereunto signed my name and affixed my seal, in the presence of two attesting witnesses, at Syracuse, in the county of Onondaga, in the State of New York, this 1st day of October, 1883.

HARVEY A. MOYER. [L. S.]

Witnesses:
WM. C. RAYMOND,
C. BENDIXON.